(12) United States Patent
Sherman

(10) Patent No.: US 6,288,369 B1
(45) Date of Patent: Sep. 11, 2001

(54) COOKING APPARATUS

(76) Inventor: Victor L. Sherman, 67 Woodceet Dr., Mastic Beach, NY (US) 11951

( * ) Notice: Subject to any disclaimer, the term of this patent is extended or adjusted under 35 U.S.C. 154(b) by 0 days.

(21) Appl. No.: 09/736,943

(22) Filed: Dec. 15, 2000

(51) Int. Cl.[7] .............................. A47J 37/06; A21B 1/14; A21B 1/22; F27D 11/06
(52) U.S. Cl. ........................... 219/405; 219/411; 99/389; 99/392; 99/447
(58) Field of Search .................................... 219/405, 411, 219/530; 392/416, 418; 99/385, 389, 391, 392, 447; 126/22

(56) References Cited

U.S. PATENT DOCUMENTS 3,714,885 * 2/1973 Wertheimer et al. ................. 99/447
4,396,825 * 8/1983 Cox et al. ............................... 99/389
5,036,179 * 7/1991 Westerberg et al. ................. 219/411

FOREIGN PATENT DOCUMENTS

133847 * 3/1985 (EP) .

* cited by examiner

*Primary Examiner*—Joseph Pelham

(57) ABSTRACT

An electric broiler-toaster-oven with the broiling heaters installed above the food to be cooked. In order to direct heat down to the food, it uses a reflector unit which consists of the absorber plate and a series of reflectors. This arrangement increases efficiency and the speed of cooking, and provides for extremely clean operation: no fumes are emitted, very few parts are to be cleaned, and no burnt deposits are created on food.

10 Claims, 4 Drawing Sheets

COOKING APPARATUS

BACKGROUND OF THE INVENTION

The present invention relates to an apparatus for cooking food. Such apparatuses are widely used and are based on various principles. One of the known apparatuses is disclosed in the U.S. Pat. Nos. 4,852,545 and 4,913,040 (Sherman et al.) and includes two heated plates so as to apply simultaneously heat and pressure to the initial food material. Other apparatuses use radiated or convection heat (charcoal, or electric). Performance of the above cooking apparatuses can be further improved.

SUMMARY OF THE INVENTION

Accordingly, it is an objective of the present invention to provide a cooking apparatus which is an improvement of apparatuses of the prior art. In keeping with this objective and with others which will become apparent hereinafter, one feature of the present invention resides, briefly stated, in a cooking apparatus having a housing means to accommodate the food to be cooked, and a heater means that provide heat for cooking. The housing has shelves that support grill(s) and/or pan(s) for cooking.

The heater means includes at least one electric heater located above the food material for radiating heat and heating up the air inside of the housing. In order to direct heat down to the food material, the above heater means includes also a reflector means whose main innovative feature is that said reflector means comprises two stages. Its first stage (the closest to the heater) is a heat absorber-generally non-reflective plate that meets the flow of rising up heat (both, radiation and convection) first, heats up itself, and radiates heat back down. The next stage is at least one reflector which is protected by the absorber from fat and juices splashes and from the intense heat. Reflector returns to the absorber plate the part of heat raised up from it. In order to increase heat insolating efficiency, the space(s) between the absorber and the reflector and/or between reflectors can be filled with crumbled foil (for instance, aluminum).

This novel arrangement increases efficiency of the apparatus during broiling up to 75–85% vs. usual 35–50% typical of apparatuses with top location of heaters and with conventional types of reflectors. Without juices and fats that pour to the heaters and burn, this arrangement eliminates staining food with carcinogenic carbon deposits, and prevents emitting smoke or fumes so that the arrangements can be used both indoor and outdoor.

The heater means can also comprise heaters located below the food (for toasting and baking).

As a result, the inventive apparatus can be used in the following variations:

a) An indoor toaster-oven with enhanced broiling capabilities
 b) An indoor Broiler
 c) An outdoor broiler.

The novel features of the present invention are set forth in particular in the appended claims. The invention itself, however, will be best understood from the following description of the preferred embodiments which is accompanied by the following drawings.

DESCRIPTION OF PREFERRED EMBODIMENTS

Figure 1:
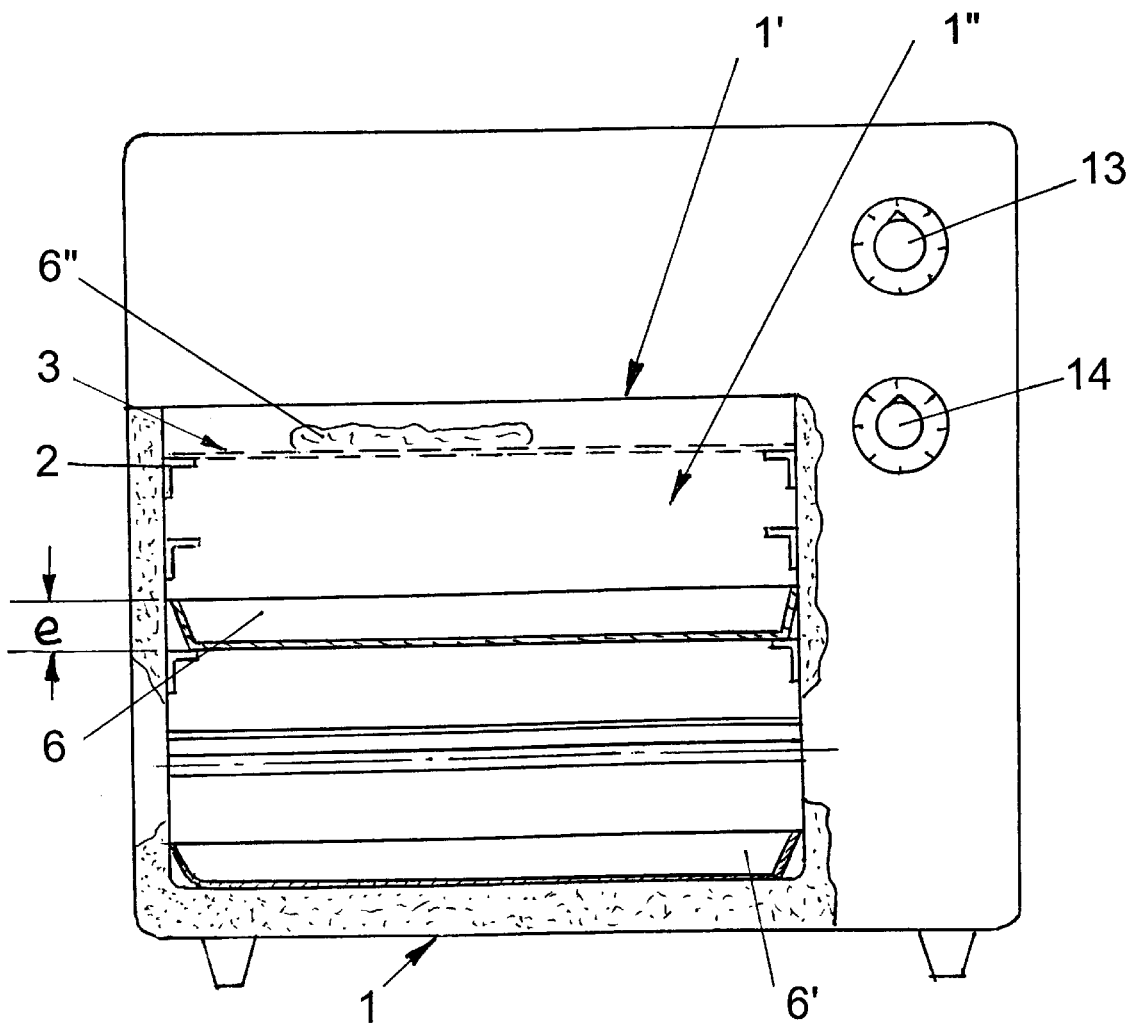
FIG. 1 is a front view of the inventive cooking apparatus, an indoor toaster-oven version with enhanced broiling capabilities.
Figure 2:
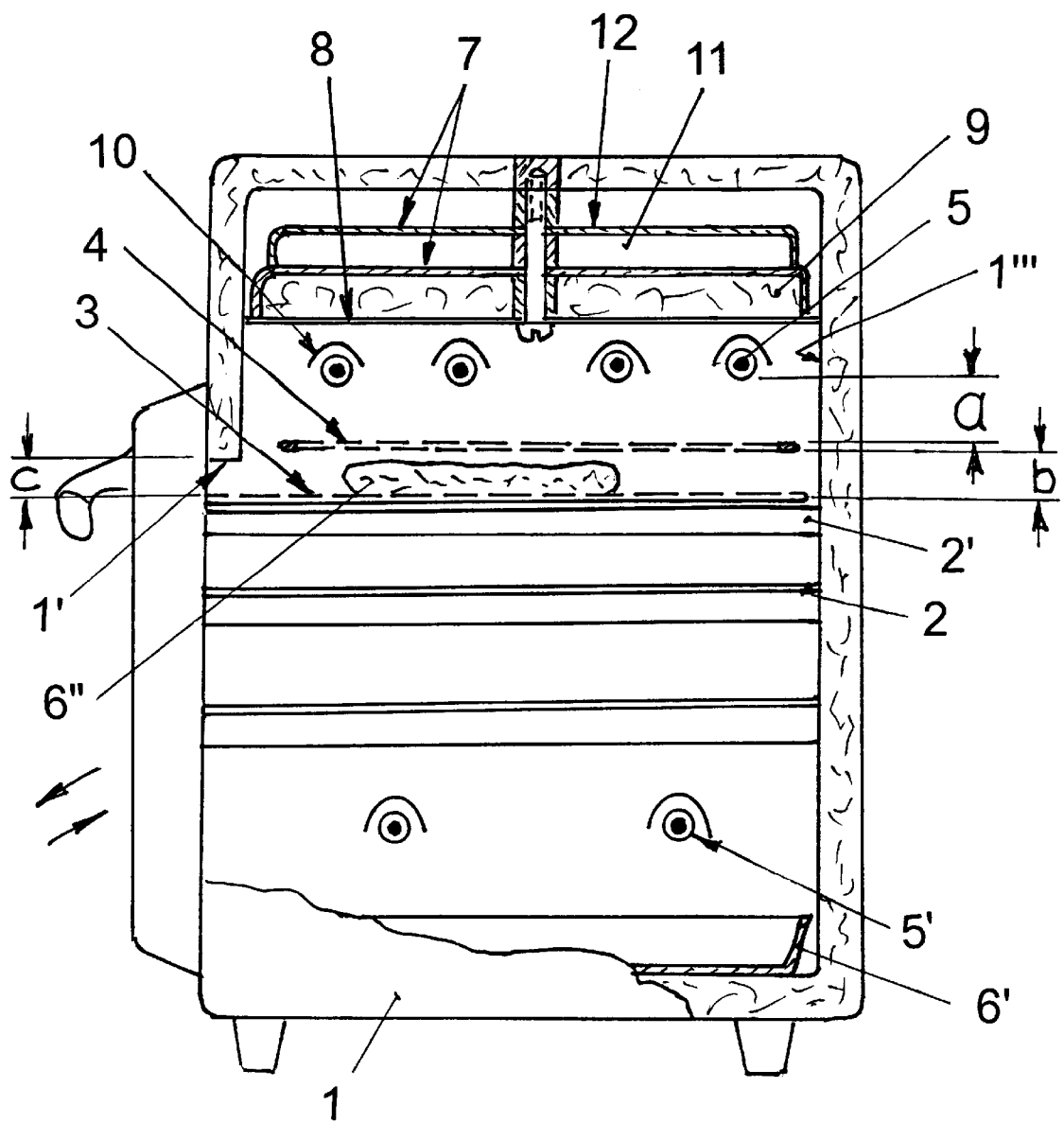
FIG. 2 is a side view of the same.

An indoor toaster-oven with enhanced broiling capabilities is shown in FIGS. 1 and 2, and incorporates a heat insulated housing means 1 with several pairs of shelves 2 that accommodate movable cooking grill 3. Above the shelves, there is a safety grill 4 which prevents food from direct contact with the heaters 5. Preferable distance ("a") between the heaters 5 and the safety grill 4 is ¾ to 1¼":

$$¾" < a < 1¼"$$

The food 6" to be cooked is placed on the grill 3 directly, or on the pan 6 that is placed on the grill 3, or directly on the shelves 2.

When hamburgers or the like foods (thin and fat) are to be cooked to "medium" or "rare" doneness, the grill 3 shall be placed on the upper pair of shelves 2', but safety grill 4 prevents food's contact (or too close location) to heaters 5. In order to prevent accumulation of fats which can catch fire, it is necessary that the hamburgers be cooked on the grill only, while the fat shall drop down to the pan 6'. To this end, the rim's height "e" of the pan 6 is such that the pan cannot fit the space under safety grill when grill 3 is placed on the upper shelf 2' and, therefore, cannot be used for cooking foods on the top shelves:

$$e > b$$

where "b" is the distance between the shelf 2' and the safety grill 4.

Other safety features of this toaster-oven-broiler are:

a) The upper edge 1' of the opening 1' in the housing 1 is located generally at the same level as the safety grill 4 so that the pan 6 could not be used on the upper shelf 2':

$$c = b$$

b) Above the upper edge 1', the internal surface 1'" of the housing 1 has no holes, slots or cracks in order to prevent though-flow of air from bringing up flame if occasional splashes of fat reach heaters.

Since with electrical heating, the amperage available from the electric line (usually, 15 amps) is a major limiting factor, the upper heaters (which do broiling) are together wired for the full power of the apparatus (that is about 1500 watts).

For broiling, only the upper heaters are on. Lower heaters 5' are off during broiling. For other functions like toasting and baking, when lower heaters 5' shall be turned on, the wiring is done in such a way (known in the art) that upper heaters work only at a part of their capacity. For instance, in the apparatus described, only two of the four upper heaters 5 are on for toasting or baking, while two lower heaters 5' are on. Altogether, it is still four operational heaters at the same full power of 1500 watts.

Together, reflectors 7 and the heat absorber plate 8 form the reflector unit 12 whose principle of operation differs essentially from that of prior art. This is dictated by the following circumstances:

1. The heat carried up by the convection air cannot be returned back by a reflector.

2. The first (closest to the heaters) plate cannot be kept clean and reflective during the service because of its oxidation at high temperatures and splashes of fat and juices from the food which later burn. Therefore, it cannot efficiently reflect red and infrared rays, but can only absorb them.

3. In the vicinity of the heater, above the food, use of fibrous, or porous heat insulation which may deteriorate with time and drop down, should be avoided.

Therefore, the closest to the heaters stage is made as a heat absorber-generally dark plate 8 in order to facilitate absorbing of both the radiation and convection heat that come up from the electric heaters 5. As to the reflectors 7, since the spaces 11 (which are closed) are much cooler than the space directly above the heaters, and there are no contaminating splashes of fat or juices there, these reflectors can stay reflective during the service.

With the fact that the electric heaters 5 radiate equally up and down, and the convection by hot air carries up approx. 20% of the total electric heater's power, the absorber plate 8 receives approximately 60% of the total power. As the result, it becomes red-hot, and radiates heat (infrared and red rays) back down, to the electric heater(s) and to the food to be cooked. Another part of the heat radiated by the absorber plate goes up to the first reflector 7 which returns it back to the absorber plate 8. The second reflector 7 does the same job, thus making the cooking apparatus even more energy efficient and preventing the top of the housing 1 from being overheated. For further improvement of the efficiency, space (s) between absorber plate and the reflector, and/or between the reflectors can be filled with crumbled aluminum foil 9.

The described design of the heater means (heaters and reflector means) turns 75 to 85% of the power directly to cooking, making all the operation fast and efficient. It also makes the operation clean: no fumes, clean food, and minimum cleaning after the cooking is done.

Since organic tissues (which, in fact, constitute our food) have different degree of penetrability for red and infrared rays of different frequencies (more opaque for higher frequencies emitted at higher temperatures), adjustment of the temperature of electric element allows to adjust the pattern of the heat penetration: from surface searing at higher temperatures to mostly deep cooking (similar to baking) at lower temperatures. Change from searing to baking mode allows to adjust the doneness of the food: it shall be first seared and caramelized on the surface, then baked (if needed) to the necessary doneness of the core. Hot air deflectors 10 allow to achieve more even distribution of temperatures in the vicinity of the food to be cooked. For the convenience of the operation, the apparatus has at least temperature control 13 and a tinier 14. Additionally, the degree of doneness can be adjusted by controlling the distance of the food to the heaters 5 (by placing the grill 3 lower or higher, at different shelves 2).

Figure 3:
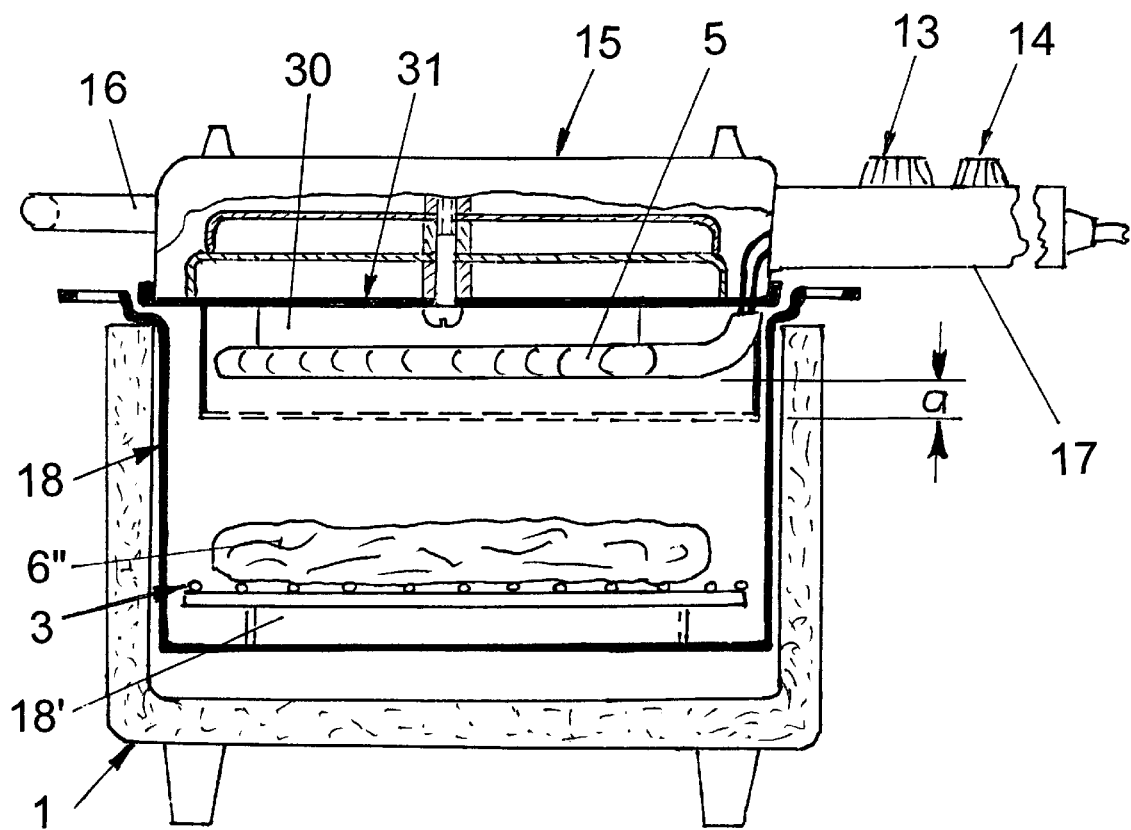
FIG. 3 is another version of the inventive cooking apparatus, an indoor broiler.

An indoor broiler as another version of the inventive cooking apparatus is shown in the FIG. 3. The heater and reflector unit are made together as one heater unit 15 which is detachable from the housing 1. It has handles 16 and 17 and controls 13 and 14.

The cooking grill 3 can be placed either directly on the bottom of the pot-liner 18, or can be raised with spacer rings 18' for more pronounced searing mode of cooking. Since the pot-liner is opened to the top, the heater unit can be removed, or turned on hinges, and the food can be taken from the pot-liner directly.

Figure 4:
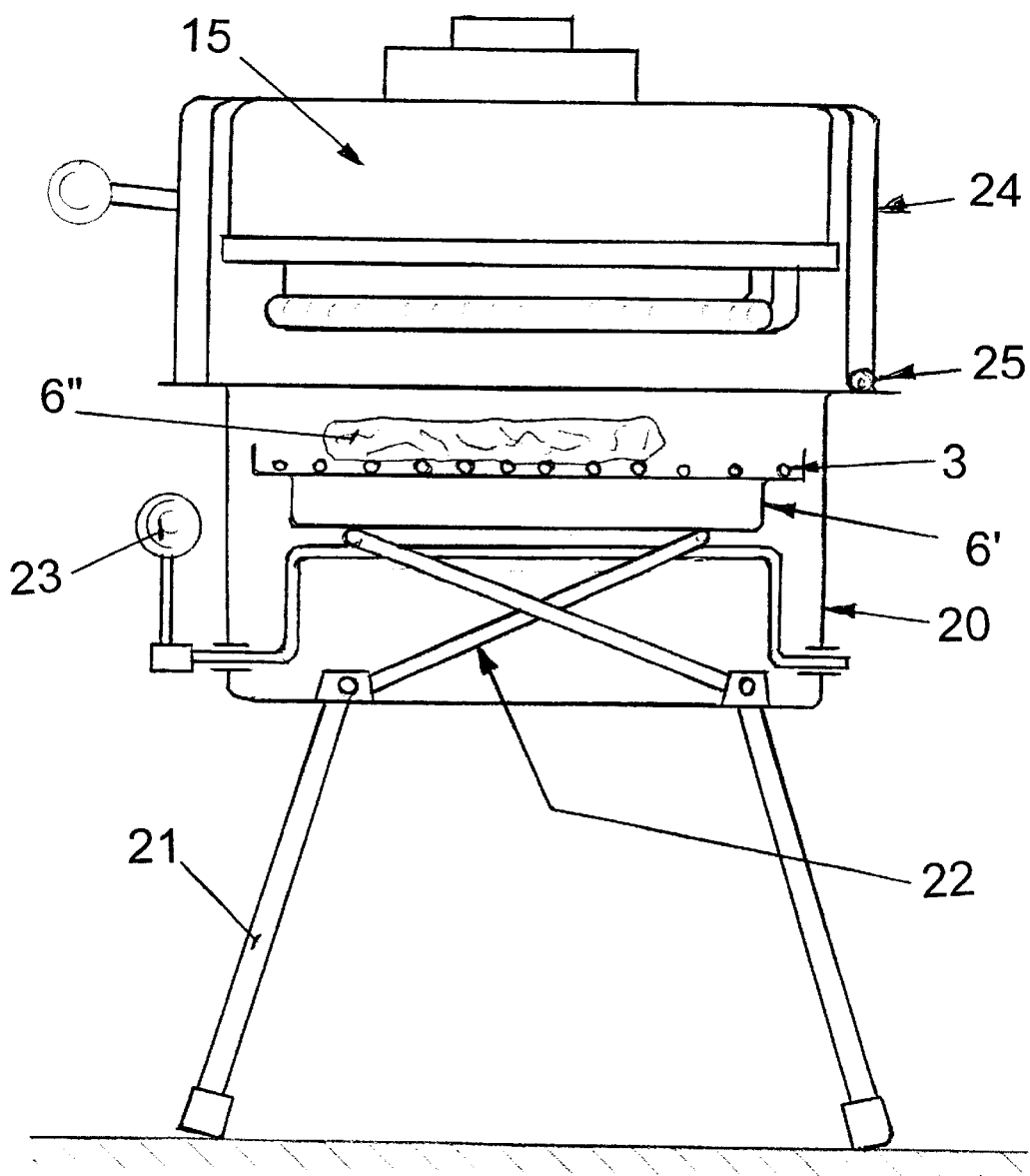
FIG. 4 is still another version of the inventive cooking apparatus, an outdoor broiler.

An outdoor broiler as still another version of the inventive cooking apparatus is shown in FIG. 4. Here, the bottom housing 20 on legs 21 accommodates a grease collecting pan 6' with the cooking grill 3. The height of the grill and pan location can be adjusted by using the combination of levers 22 and a crank 23 known in the art. The upper housing 24 can be swung on a hinge 25. The housing has a cutout on its top to accommodate the heater unit 15, which can be attached to the upper housing by screws, clamps or similar means known in the art, and when not in use can be stored indoor.

The heater unit 15 is basically the same as in the indoor broiler, except that it must meet regulation applied to the outdoor electric equipment. Since outdoor grilling/broiling units arc often used for partying, the power of the heaters can be increased, and 220V system can be used.

This invention is not limited to the details shown since various modifications and structural changes are possible without departing in any way from the spirit of the present invention. What is desired to be protected is set forth in particular in the appended claims.

What is claimed is:

1. A cooking apparatus for cooking food, comprising at least a housing means to accommodate the food to be cooked, and a heater means;

said heater means comprising at least one electric heater located above the food to be cooked, and a reflector means;

said electric heater being of certain power capacity coordinated with the capacity of the electric line;

said reflector means having at least one heat absorbing plate above said electric heater to absorb and emit back down the heat received from said electric heater, and at least one reflector above the heat absorbing plate to reflect the heat received from said absorber plate;

said heat absorbing plate being generally dark and non-reflective;

said reflector having at least one reflective surface.

2. A cooking apparatus as defined in claim 1, wherein the space between said absorber plate and said reflector, and the spaces between said reflectors are closed.

3. A cooking apparatus as defined in claim 1, wherein at least one space between said absorber plate and said reflector, or at least one space between said reflectors is filled with crumbled foil.

4. A cooking apparatus as defined in claim 1 that comprises temperature adjustment means.

5. A cooking apparatus as defined in claim 1 that comprises timer means.

6. A cooking apparatus as defined in claim 1, wherein said housing has a side door for inserting and removing the food.

7. A cooking apparatus as defined in claims 1 and 6, wherein said electric heater is wired for the fill cooking apparatus's power capacity for broiling.

8. A cooking apparatus as defined in claims 1 and 6, wherein said heater means has additional heaters below the food for toasting and baking.

9. A cooking apparatus as defined in claims 1, and 6 thru 8, wired to be capable of being switched in such a manner that the fill power of the apparatus is either applied to upper heater(s) only, or shared between upper and lower heaters.

10. A cooking apparatus as defined in claims 1 wherein the housing has a pot-liner opened to the top.

* * * * *